US011815905B2

(12) United States Patent
Haeusler et al.

(10) Patent No.: US 11,815,905 B2
(45) Date of Patent: *Nov. 14, 2023

(54) SYSTEMS AND METHODS FOR OPTICAL TARGET BASED INDOOR VEHICLE NAVIGATION

(71) Applicant: Crown Equipment Corporation, New Bremen, OH (US)

(72) Inventors: Ralf Haeusler, Auckland (NZ); Stuart Park, Auckland (NZ); Mark Bell, Auckland (NZ)

(73) Assignee: Crown Equipment Corporation, New Bremen, OH (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/506,946

(22) Filed: Oct. 21, 2021

(65) Prior Publication Data

US 2022/0043457 A1 Feb. 10, 2022

Related U.S. Application Data

(63) Continuation of application No. 16/280,736, filed on Feb. 20, 2019, now Pat. No. 11,181,925.

(Continued)

(51) Int. Cl.
*G05D 1/02* (2020.01)
*G01C 21/20* (2006.01)
(Continued)

(52) U.S. Cl.
CPC ........... *G05D 1/0251* (2013.01); *G01C 15/04* (2013.01); *G01C 21/206* (2013.01);
(Continued)

(58) Field of Classification Search
CPC ...... G05D 1/02; G05D 1/0212; G05D 1/0088; G05D 1/0246; G06F 7/00; G06F 17/00;
(Continued)

(56) References Cited

U.S. PATENT DOCUMENTS 5,798,920 A * 8/1998 Crucius .................. G05B 19/39
414/273
9,174,830 B1 * 11/2015 Bell ..................... G05D 1/0088
(Continued)

FOREIGN PATENT DOCUMENTS

CN 106461400 B 8/2019

OTHER PUBLICATIONS

"A New Mobile Robot Guidance System Using Optical Reflectors" Proceedings of the 1992 IEEE/RSJ International Conference on Intelligent Robots and Systems Raleigh, NC Jul. 7-10, 1992 (Year: 1992).*

(Continued)

*Primary Examiner* — Yuri Kan
(74) *Attorney, Agent, or Firm* — DINSMORE & SHOHL LLP

(57) ABSTRACT

Vehicles, systems, and methods for navigating or tracking the navigation of a materials handling vehicle along a surface that may include a camera and vehicle functions to match two-dimensional image information from camera data associated with the input image of overhead features with a plurality of global target locations of a warehouse map to generate a plurality of candidate optical targets, an optical target associated with each global target location and a code; filter the targets to determine a candidate optical target; decode the target to identify the associated code; identify an optical target associated with the identified code; determine a camera metric relative to the identified optical target and the position and orientation of the identified optical target in the warehouse map; calculate a vehicle pose based on the camera metric; and navigate the materials handling vehicle utilizing the vehicle pose.

19 Claims, 6 Drawing Sheets

Related U.S. Application Data

(60) Provisional application No. 62/634,219, filed on Feb. 23, 2018.

(51) Int. Cl.
  *G06T 7/73* (2017.01)
  *G01C 15/04* (2006.01)
  *G06V 20/10* (2022.01)
  *G06V 20/56* (2022.01)

(52) U.S. Cl.
  CPC ......... *G05D 1/0212* (2013.01); *G05D 1/0234* (2013.01); *G05D 1/0272* (2013.01); *G06T 7/73* (2017.01); *G06V 20/10* (2022.01); *G06V 20/56* (2022.01); *G05D 2201/0216* (2013.01); *G06T 2207/30204* (2013.01); *G06T 2207/30248* (2013.01)

(58) Field of Classification Search
  CPC .. G06T 7/00; G06T 7/74; H05B 37/02; F21V 29/00; G05B 19/18; B60R 1/00; B60W 40/04; G01C 21/20; G06K 9/00
  See application file for complete search history.

(56) References Cited

U.S. PATENT DOCUMENTS

| | | | | |
|---|---|---|---|---|
| 10,351,129 | B2* | 7/2019 | Luo | B60W 10/18 |
| 11,181,925 | B2* | 11/2021 | Haeusler | G01C 15/04 |
| 2009/0267540 | A1* | 10/2009 | Chemel | H05B 47/18 |
| | | | | 315/297 |
| 2011/0010023 | A1* | 1/2011 | Kunzig | G05D 1/0234 |
| | | | | 701/2 |
| 2012/0000974 | A1* | 1/2012 | Hung | G06F 3/147 |
| | | | | 235/375 |
| 2014/0084050 | A1* | 3/2014 | Calvarese | G01C 21/206 |
| | | | | 235/375 |
| 2015/0043206 | A1* | 2/2015 | Donegan | F21V 7/048 |
| | | | | 362/235 |
| 2015/0094900 | A1* | 4/2015 | Bell | G06T 7/13 |
| | | | | 701/28 |
| 2015/0379704 | A1* | 12/2015 | Chandrasekar | G06T 7/70 |
| | | | | 701/25 |
| 2017/0069092 | A1* | 3/2017 | Bell | G06K 9/00791 |
| 2017/0205237 | A1* | 7/2017 | White | G01C 21/206 |
| 2018/0106621 | A1* | 4/2018 | Bell | G01C 21/206 |

OTHER PUBLICATIONS

International Search Report and Written Opinion dated May 31, 2019 relating to International Application No. PCT/US2019/018768.

Chinese office action dated Nov. 1, 2021 relating to Chinese Patent Application No. 201980021348.X filed Feb. 20, 2019.

* cited by examiner

SYSTEMS AND METHODS FOR OPTICAL TARGET BASED INDOOR VEHICLE NAVIGATION

CROSS REFERENCE TO RELATED APPLICATIONS

The present specification is a continuation of Ser. No. 16/280,736, filed Feb. 20, 2019, which claims priority to U.S. Provisional Patent Application Ser. No. 62/634,219, filed Feb. 23, 2018, each entitled "SYSTEMS AND METHODS FOR OPTICAL TARGET BASED INDOOR VEHICLE NAVIGATION," the entireties of which are incorporated by referenced herein.

TECHNICAL FIELD

The present specification generally relates to systems and methods for providing global localization for industrial vehicles based on overhead features and, more specifically, to systems and methods for utilization of a global localization to analyze overhead optical targets in a warehouse to track the location of an industrial vehicle with a known or unknown location.

BACKGROUND

In order to move items about an industrial environment, workers often utilize industrial vehicles, including for example, forklift trucks, hand and motor driven pallet trucks, and/or other materials handling vehicles. The industrial vehicles can be configured as an automated guided vehicle or a manually guided vehicle that navigates through the environment. In order to facilitate automated guidance, navigation, or both, the industrial vehicle may be adapted for localization within the environment. That is, the industrial vehicle can be adapted with sensors and processors for determining the location of the industrial vehicle within the environment such as, for example, pose and position of the industrial vehicle.

SUMMARY

In one embodiment, a materials handling vehicle may include a camera, a vehicular processor, a drive mechanism configured to move the materials handling vehicle along an inventory transit surface, a materials handling mechanism configured to store and retrieve goods in a storage bay of a warehouse, and vehicle control architecture in communication with the drive and materials handling mechanisms. The camera may be communicatively coupled to the vehicular processor and captures an input image of overhead features. The vehicular processor of the materials handling vehicle executes vehicle functions to (i) retrieve an initial set of camera data from the camera, the initial set of camera data comprising two-dimensional image information associated with the input image of overhead features, and (ii) match the two-dimensional image information from the initial set of camera data with a plurality of global target locations of a warehouse map to generate a plurality of candidate optical targets. The global target locations of the warehouse map may be associated with a mapping of the overhead features, the warehouse map may be configured to store a position and orientation of an optical target associated with each global target location, and each optical target may be associated with a code. The vehicle functions may further be to (iii) filter the plurality of candidate optical targets to determine a candidate optical target, (iv) decode the candidate optical target to identify the code associated with the candidate optical target, (v) identify an optical target associated with the identified code, (vi) determine a camera metric comprising representations of a distance and an angle of the camera relative to the identified optical target and the position and orientation of the identified optical target in the warehouse map, (vii) calculate a vehicle pose based on the camera metric, and (viii) navigate the materials handling vehicle utilizing the vehicle pose.

In another embodiment, a materials handling vehicle may include a camera, a vehicular processor, a drive mechanism configured to move the materials handling vehicle along an inventory transit surface, a materials handling mechanism configured to store and retrieve goods in a storage bay of a warehouse, and vehicle control architecture in communication with the drive and materials handling mechanisms. The camera may be communicatively coupled to the vehicular processor and captures an input image of overhead features. The vehicular processor of the materials handling vehicle executes vehicle functions to (i) retrieve an initial set of camera data from the camera, the initial set of camera data comprising two-dimensional image information associated with the input image of overhead features, and (ii) match the two-dimensional image information from the initial set of camera data with a plurality of global target locations of a warehouse map to generate a plurality of candidate optical targets. The global target locations of the warehouse map may be associated with a mapping of the overhead features, the warehouse map may be configured to store a position and orientation of an optical target associated with each global target location, and each optical target may be associated with a code. Each optical target may include a plurality of point light sources mounted on a bar that is configured for attachment to a ceiling as an overhead feature of the overhead features, and the plurality of point light sources comprise a light pattern as the code for each respective optical target. The vehicle functions may further be to (iii) filter the plurality of candidate optical targets to determine a candidate optical target, (iv) decode the candidate optical target to identify the code associated with the candidate optical target, (v) identify an optical target associated with the identified code, (vi) determine a camera metric comprising representations of a distance and an angle of the camera relative to the identified optical target and the position and orientation of the identified optical target in the warehouse map, (vii) calculate a vehicle pose based on the camera metric, and (viii) track the navigation of the materials handling vehicle along the inventory transit surface, navigate the materials handling vehicle along the inventory transit surface in at least a partially automated manner, or both, utilizing the vehicle pose.

In yet another embodiment, a method of navigating or tracking the navigation of a materials handling vehicle along an inventory transit surface may include disposing a materials handling vehicle upon an inventory transit surface of a warehouse, wherein the materials handling vehicle comprises a camera, a vehicular processor, a drive mechanism configured to move the materials handling vehicle along the inventory transit surface, a materials handling mechanism configured to store and retrieve goods in a storage bay of the warehouse, and vehicle control architecture in communication with the drive and materials handling mechanisms. The method may further include utilizing the drive mechanism to move the materials handling vehicle along the inventory transit surface, capturing an input image of overhead features of the warehouse via the camera as the materials handling vehicle moves along the inventory transit surface, and retrieving an initial set of camera data from the camera, the initial set of camera data comprising two-dimensional image information associated with the input image of overhead features. The method may further include matching the two-dimensional image information from the initial set of camera data with a plurality of global target locations of a warehouse map to generate a plurality of candidate optical targets, wherein the global target locations of the warehouse map are associated with a mapping of the overhead features, the warehouse map is configured to store a position and orientation of an optical target associated with each global target location, and each optical target is associated with a code. The method may further include filtering the plurality of candidate optical targets to determine a candidate optical target, decoding the candidate optical target to identify the code associated with the candidate optical target, identifying an optical target associated with the identified code, determining a camera metric comprising representations of a distance and an angle of the camera relative to the identified optical target and the position and orientation of the identified optical target in the warehouse map, calculating a vehicle pose based on the camera metric, and navigating the materials handling vehicle utilizing the vehicle pose.

These and additional features provided by the embodiments described herein will be more fully understood in view of the following detailed description, in conjunction with the drawings.

BRIEF DESCRIPTION OF THE SEVERAL VIEWS OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
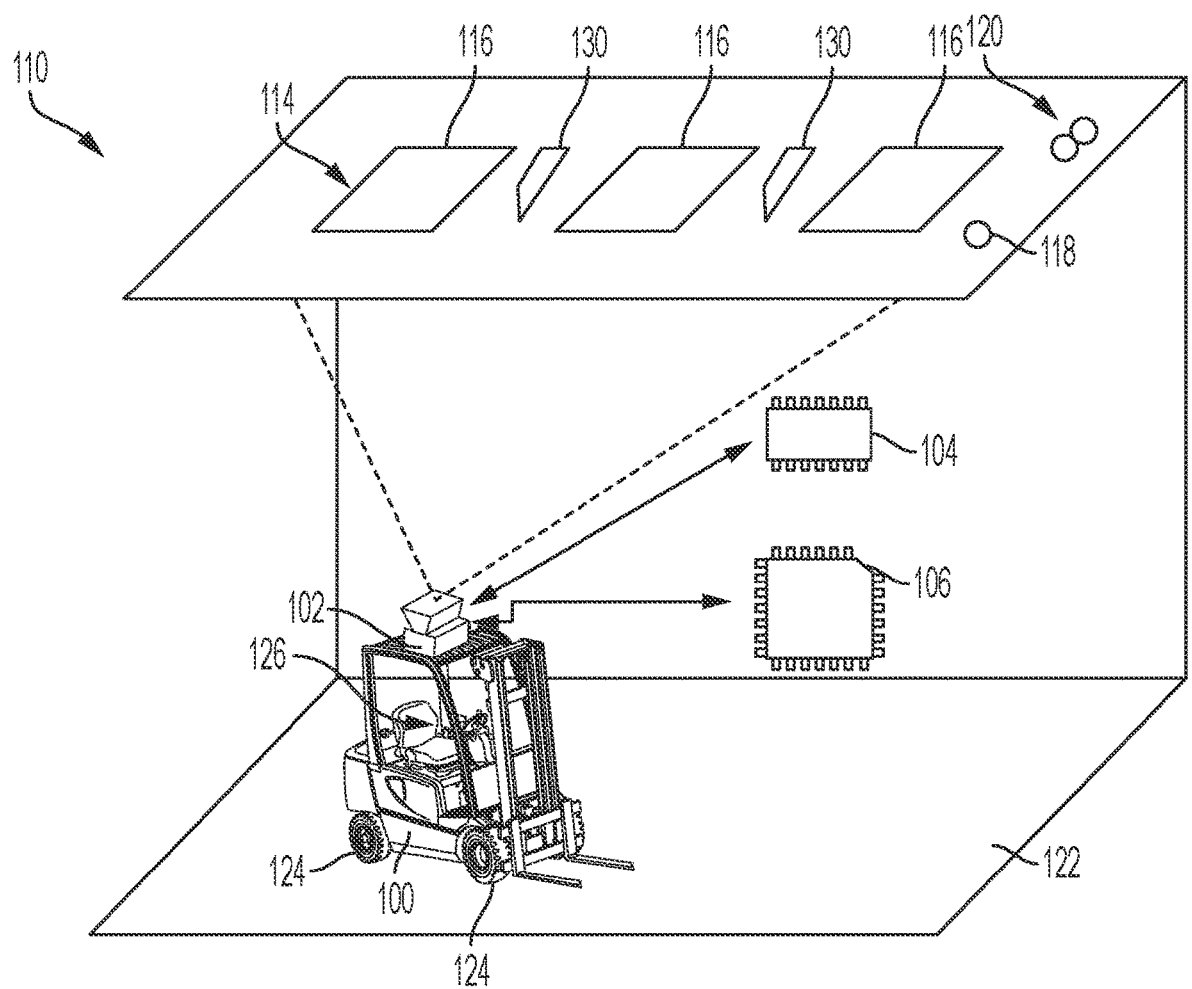
FIG. 1 depicts a vehicle for localization according to one or more embodiments shown and described herein.

The embodiments described herein generally relate to localization techniques for extracting features from overhead features including, but not limited to, optical targets as described herein. Localization is utilized herein to refer to any of a variety of system configurations that enable active tracking of a vehicle location in a warehouse, industrial facility, or other environment. The concepts of the present disclosure are not limited to any particular localization system configuration and are deemed to be applicable to any of a variety of conventional and yet-to-be developed localization systems. As will be described in greater detail further below, a localization system may be used alongside a global target localization method (GTLM) and/or validation system such that, if an industrial vehicle is lost through the localization system method, the GTLM may be utilized to recover the vehicle, and the validation system may be utilized to check the accuracy of the recovery before publishing a new current vehicle location. Additionally or alternatively, the GTLM may be utilized as a localization system itself as well as a recovery system, and/or the validation system may be used with the localization systems and/or the GTLM systems. Such localization systems may include those described in U.S. Pat. No. 9,349,181 issued on May 24, 2016, entitled LOST VEHICLE RECOVERY UTILIZING ASSOCIATED FEATURE PAIRS, and U.S. Pat. No. 9,984,467 entitled VEHICLE POSITIONING OR NAVIGATION UTILIZING ASSOCIATED FEATURE PAIRS, issued on May 29, 2018, both of which are incorporated by reference herein in their entirety. Any inconsistencies in the manner in which particular technical terms or phrases are defined in these references, as compared to the content of the present application, should be interpreted with primary reference to the manner in which the terms or phrases are defined in the present application.

Embodiments described herein generally relate to such localization techniques for a materials handling vehicle in a warehouse environment. For the purposes of defining and describing the concepts and scope of the present disclosure, it is noted that a "warehouse" encompasses any indoor or otherwise covered facility in which materials handling vehicles transport goods including, but not limited to, warehouses intended primarily for the storage of goods, such as those where single or multi-level warehouse racks or storage units are arranged in aisles or otherwise, and manufacturing facilities where goods are transported about the facility by materials handling vehicles for use in one or more manufacturing processes.

Thus, the localization systems may be used to localize and/or navigate an industrial vehicle through a building structure, such as a warehouse. Suitably, the overhead features such as optical targets as described herein as well as lighting may be mounted in or on a ceiling of a building. However, in some embodiments the overhead features may also or alternatively be suspended from a ceiling or wall via suitable structure. In some embodiments, a camera can be mounted to an industrial vehicle (e.g., automated guided vehicle or a manually guided vehicle) that navigates through a warehouse. The input image can be any image captured from the camera prior to extracting features from the image.

Referring now to FIG. 1, a vehicle 100 can be configured to navigate through an industrial facility such as a warehouse 110. The vehicle 100 can comprise a materials handling vehicle including a drive mechanism to move the materials handling vehicle along an inventory transit surface, a materials handling mechanism configured to store and retrieve goods in a storage bay of an industrial facility, and vehicle control architecture in communication with the drive and materials handling mechanisms. The vehicle 100 can comprise an industrial vehicle for lifting and moving a payload such as, for example, a forklift truck, a reach truck, a turret truck, a walkie stacker truck, a tow tractor, a pallet truck, a high/low, a stacker-truck, trailer loader, a sideloader, a fork hoist, or the like. The industrial vehicle can be configured to automatically or manually navigate an inventory transit surface such as a surface 122 of the warehouse 110 along a desired path. Accordingly, the vehicle 100 can be directed forwards and backwards by rotation of one or more wheels 124. Additionally, the vehicle 100 can be caused to change direction by steering the one or more wheels 124. Optionally, the vehicle can comprise operator controls 126 for controlling functions of the vehicle such as, but not limited to, the speed of the wheels 124, the orientation of the wheels 124, or the like. The operator controls 126 can comprise controls that are assigned to functions of the vehicle 100 such as, for example, switches, buttons, levers, handles, pedals, input/output device, or the like. It is noted that the term "navigate" as used herein can mean controlling the movement of a vehicle from one place to another.

The vehicle 100 can further comprise a camera 102 for capturing overhead images such as input images of overhead features. The camera 102 can be any device capable of capturing the visual appearance of an object and transforming the visual appearance into an image. Accordingly, the camera 102 can comprise an image sensor such as, for example, a charge coupled device, complementary metal-oxide-semiconductor sensor, or functional equivalents thereof. In some embodiments, the vehicle 100 can be located within the warehouse 110 and be configured to capture overhead images of the ceiling 112 of the warehouse 110. In order to capture overhead images, the camera 102 can be mounted to the vehicle 100 and focused to the ceiling 112. For the purpose of defining and describing the present disclosure, the term "image" as used herein can mean a representation of the appearance of a detected object. The image can be provided in a variety of machine readable representations such as, for example, JPEG, JPEG 2000, TIFF, raw image formats, GIF, BMP, PNG, Netpbm format, WEBP, raster formats, vector formats, or any other format suitable for capturing overhead objects.

The ceiling 112 of the warehouse 110 can comprise overhead features such as overhead optical targets 130 and overhead lights such as, but not limited to, ceiling lights 114 for providing illumination from the ceiling 112 or generally from above a vehicle operating in the warehouse. The ceiling lights 114 can comprise substantially rectangular lights such as, for example, skylights 116, fluorescent lights, or the like; and may be mounted in or suspended from the ceiling or wall structures so as to provide illumination from above. As used herein, the term "skylight" can mean an aperture in a ceiling or roof fitted with a substantially light transmissive medium for admitting daylight, such as, for example, air, glass, plastic or the like. While skylights can come in a variety of shapes and sizes, the skylights described herein can include "standard" long, substantially rectangular skylights that may or may not be split by girders or crossbars into a series of panels. Alternatively, skylights can comprise smaller, discrete skylights of rectangular or circular shape that are similar in size to a bedroom window, i.e., about 30 inches by about 60 inches (about 73 cm by about 146 cm). Alternatively or additionally, the ceiling lights 114 can comprise substantially circular lights such as, for example, round lights 118, merged lights 120, which can comprise a plurality of adjacent round lights that appear to be a single object, or the like. Thus, overhead lights or 'ceiling lights' include sources of natural (e.g. sunlight) and artificial (e.g. electrically powered) light.

The embodiments described herein can comprise one or more vehicular processors such as processors 104 communicatively coupled to the camera 102. The one or more processors 104 can execute machine readable instructions to implement any of the methods or functions described herein automatically. Memory 106 for storing machine readable instructions can be communicatively coupled to the one or more processors 104, the camera 102, or any combination thereof. The one or more processors 104 can comprise a processor, an integrated circuit, a microchip, a computer, or any other computing device capable of executing machine readable instructions or that has been configured to execute functions in a manner analogous to machine readable instructions. The memory 106 can comprise RAM, ROM, a flash memory, a hard drive, or any non-transitory device capable of storing machine readable instructions.

The one or more processors 104 and the memory 106 may be integral with the camera 102. Alternatively or additionally, each of the one or more processors 104 and the memory 106 can be integral with the vehicle 100. Moreover, each of the one or more processors 104 and the memory 106 can be separated from the vehicle 100 and the camera 102. For example, a management server, server, or a mobile computing device can comprise the one or more processors 104, the memory 106, or both. It is noted that the one or more processors 104, the memory 106, and the camera 102 may be discrete components communicatively coupled with one another without departing from the scope of the present disclosure. Accordingly, in some embodiments, components of the one or more processors 104, components of the memory 106, and components of the camera 102 can be physically separated from one another. The phrase "communicatively coupled," as used herein, means that components are capable of exchanging data signals with one another such as, for example, electrical signals via conductive medium, electromagnetic signals via air, optical signals via optical waveguides, or the like.

Thus, embodiments of the present disclosure may comprise logic or an algorithm written in any programming language of any generation (e.g., 1GL, 2GL, 3GL, 4GL, or 5GL). The logic or an algorithm can be written as machine language that may be directly executed by the processor, or assembly language, object-oriented programming (OOP), scripting languages, microcode, etc., that may be compiled or assembled into machine readable instructions and stored on a machine readable medium. Alternatively or additionally, the logic or algorithm may be written in a hardware description language (HDL). Further, the logic or algorithm can be implemented via either a field-programmable gate array (FPGA) configuration or an application-specific integrated circuit (ASIC), or their equivalents.

As is noted above, the vehicle 100 can comprise or be communicatively coupled with the one or more processors 104. Accordingly, the one or more processors 104 can execute machine readable instructions to operate or replace the function of the operator controls 126. The machine readable instructions can be stored upon the memory 106. Accordingly, in some embodiments, the vehicle 100 can be navigated automatically by the one or more processors 104 executing the machine readable instructions. In some embodiments, the location of the vehicle can be monitored by the localization system as the vehicle 100 is navigated.

For example, the vehicle 100 can automatically navigate along the surface 122 of the warehouse 110 along a desired path to a desired position based upon a localized position of the vehicle 100. In some embodiments, the vehicle 100 can determine the localized position of the vehicle 100 with respect to the warehouse 110. The determination of the localized position of the vehicle 100 can be performed by comparing image data to map data. The map data can be stored locally in the memory 106, which can be updated periodically, or map data provided by a server or the like. In embodiments, an industrial facility map comprises a plurality of three-dimensional global feature points associated with a mapping of the overhead features. Given the localized position and the desired position, a travel path can be determined for the vehicle 100. Once the travel path is known, the vehicle 100 can travel along the travel path to navigate the surface 122 of the warehouse 110. Specifically, the one or more processors 104 can execute machine readable instructions to perform localization system functions and operate the vehicle 100. In one embodiment, the one or more processors 104 can adjust the steering of the wheels 124 and control the throttle to cause the vehicle 100 to navigate the surface 122.

Figure 2:
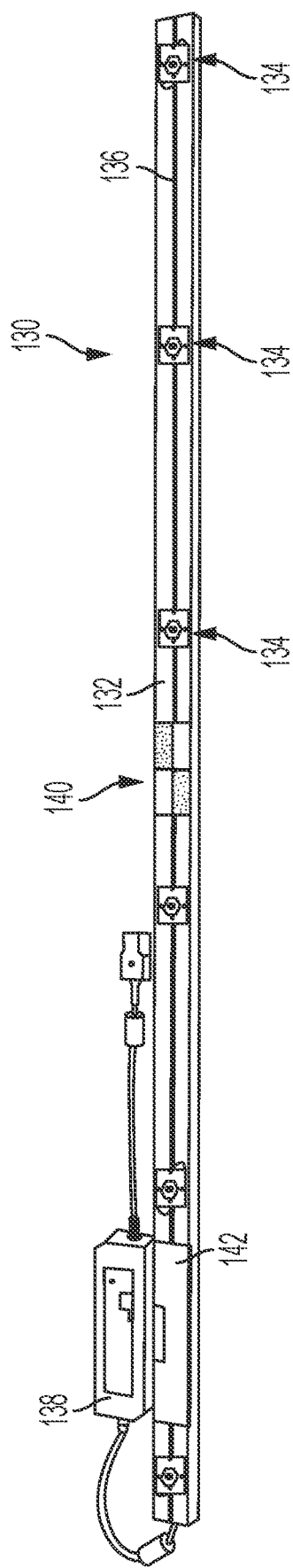
FIG. 2 depicts an exemplary optical target according to one or more embodiments shown and described herein.

Referring to FIG. 2, an optical target 130 is shown as an arrangement of point light sources. In embodiments, the optical target 130 may include angular power characteristics and be suitable for detection at long ranges. As a non-limiting example, the point light sources of the optical target 130 may include a plurality of light emitting diodes (LEDs). The LEDs may be utilized with and covered by respective angular diffusion lenses to provide angular power characteristics. The angular diffusion lenses may be batwing lenses or the like. In other embodiments, such angular diffusion lenses may not be used such that the LEDs appear most bright right below the optical target 130 but fade in brightness when viewed from a side angle with respect to the optical target 130. Use of the angular diffusion lenses allow for an attenuation of the direct downward brightness of an LED and an increase in an associated angular sideways brightness to have angular emission characteristics. With such angular emission characteristics for an LED covered by an angular diffusion lens, higher energy is emitted toward angular side directions rather than directly downwards when the LED is facing downwardly, for example. A radiation pattern may be such that, as a non-limiting example, at 10 meters distance the LEDs utilizing angular diffusion lenses appear with a similar brightness as compared to viewing the LEDS from directly below. Such a radiation pattern may ensure flat field radiation of a warehouse floor above which the optical target 130 is mounted and the LEDs are directed toward within, for example, a 60 degree cone that is centered at a downwardly directed LED. A detection range may then be double (i.e., 1/cos(60°)) the difference between a camera height mounted on a vehicle and a height of an active optical target 130 when mounted on a ceiling infrastructure of a warehouse environment and directed downwardly toward the warehouse floor. Other detection ranges for the optical target 130 are possible within the scope of this disclosure.

The optical target 130 may include a variety of structures suitable for mounting to ceiling infrastructure of a warehouse environment. In some embodiments, the optical target 130 may include a circular shape, a square shape, or other suitable mounting shape. Any two- or three-dimensional arrangement of LEDs on the optical target 130 that may or may not be equidistantly spaced is contemplated within the scope of this disclosure. For example, a square arrangement of LEDs on the optical target 130 may be considered a two-dimensional arrangement. Additionally, a single LED mounting for the optical target 130 or a multiple LED mounting are both contemplated within the scope of this disclosure.

In an embodiment, the optical target 130 may include a bar 132 on which a plurality of point light sources are mounted. The point light sources may be, for example, light emitting diodes (LEDs) 134 mounted on the bar 132. The bar 132 may be aluminum or a like material. The bar 132 may be 1.6 meters in length and include a central strip portion 136 along which the LEDs 134 are mounted in a linear manner. The bar may be longer or shorter in length in other embodiments. The LEDs may emit a white light. Alternatively, the LEDs may emit monochromatic light or light with a narrow spectral bandwidth, such as an orange light. As an example and not by limitation, six LEDs 134 may be mounted along the central strip portion 136. The six LEDs 134 may be equidistantly fitted along the central strip portion 136. The bar 132 may include more or less than six LEDs in other embodiments. A power driver 138 configured to provide power to the optical target 130 from a main power source, for example, may also be mounted on the bar 132. A series of magnetic mounts may be disposed on the back of the bar 132 to facilitate installation with ceiling infrastructure. The magnetic mounts may hold the bar 132 in place against a ceiling beam along with chains or other suitable securement fixings, for example. In embodiments, Bluetooth Low Energy (BLE) beacons may be disposed on the optical targets 130 and a BLE antenna may be disposed on vehicle hardware to be used to scan for such signals. A BLE received signal strength indication (RSSI) may be used to determine an identification between ambiguous optical targets 130 having the same identified code as a similar light pattern. Additionally or alternatively, WiFi signal strength may be utilized where locations of WiFi access points are known to the localization system to determine an identification between ambiguous optical targets 130 having the same identified code as a similar light pattern. As a non-limiting example, to disambiguate between non-unique targets 130, other observations may be utilized, such as additional camera observations, laser observations, radio-wave observations, laser observations, magnetic field observation, or a combination thereof. As a non-limiting example, with respect to a plurality of non-unique targets that include the same optical code 150, disambiguation of recovered locations may be performed by computation of a fitness-metric above a predetermined threshold and selection of the candidate target 130 with the best fit, rank, and/or match to the fitness-metric. Those non-unique active targets 130 not within a threshold or range of the fitness-metric may be rejected while the other non-unique active targets 130 are analyzed to determine the best fit and thus to identify a candidate optical target 130 as a best fit target. In embodiments, the fitness-metric may be based on distances of expected features in UV space to actually observed features, on the strength of additional radio signals from WIFI for BLE beacon sources, and/or on a proximity of wire guidance observations. Additionally or alternatively, a system as described herein may disambiguate a location with respect to one or more candidate optical targets 130 by validating a compatibility of aggregated odometry information with a physical shape of the inventory transit surface and static obstacles present on the inventory transit surface. In embodiments, when an incorrect code is determined upon failure of one or more of the LEDs of an optical target 130, for example, rather than display of the incorrect code, an "off" code status may be generated and shown. For correct codes, a "correct" or "on" code status may be generated and shown.

The optical target 130 may include a center-fiducial marker 140 that facilitates measurement of a target location in a global warehouse coordinate frame stored in a map through use along with a laser distance meter from a ground surface. An end marker 142 of the optical target 130 may be colored as black, for example, or may be another contrast color with respect to the bar 132 of the optical target 130, such as orange where the bar 132 is an aluminum extrusion that is anodized black to reduce spurious reflections. The end marker 142 of the optical target 130 may be used to polarize an orientation of the optical target 130 without knowledge of the LED on/off pattern associated to the active optical target 130. Along with a code 150 associated with the optical target 130 and the three-dimensional coordinates of the optical target 130 to indicate target location in the warehouse environment based on the map, the orientation of the optical target 130 is recorded in a localization feature map for use during localization system operation. The code 150 may be unique or non-unique with respect to the optical target 130.

Figure 3:
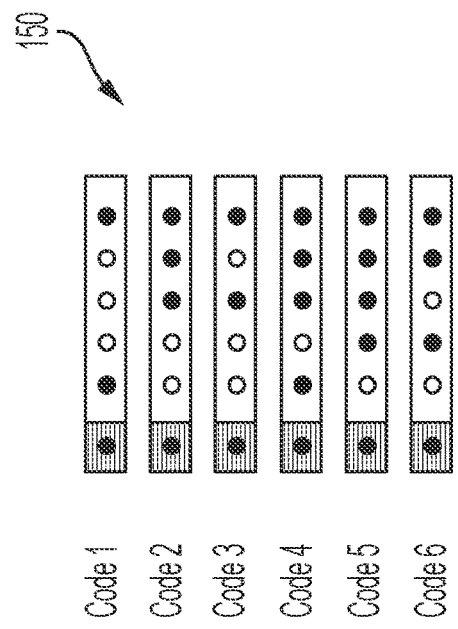
FIG. 3 depicts a plurality of active target patterns for the exemplary optical target of FIG. 2 according to one or more embodiments shown and described herein.

Referring to FIG. 3, an example of a plurality of light patterns of the optical target 130 including six LEDs 134 are shown. Each light pattern may be an optical code 150. The outer diodes may always be switched on while, of the inner diodes, at least one is on and at least one is off. The state of the inner diodes and the associated on/off pattern is associated with information regarding a code of the optical target 130. A code 150 of the optical target 130 may be extracted irrespective of a viewing direction as the on/off inner diode pattern of an optical target 130 does not change over time. In an embodiment, six codes may be associated with six respective light patterns for six optical targets 130. For example, as shown in FIG. 3, and with respect to the four inner diodes from left to right, the six optical targets 130 have the following pattern: Code 1 has a pattern of on/off/off/off; Code 2 has a pattern of off/off/on/on; Code 3 has a pattern of off/off/on/off; Code 4 has a pattern of on/off/on/on; Code 5 has a pattern of off/on/on/on; and Code 6 has a pattern of off/on/off/on. The codes may be switched to facilitate onsite usage, such as through physical switches on the optical target 130 or through remote control based switching, for example.

The optical target 130 may be mounted onto ceiling infrastructure, such as beams, purlins, and the like. Global location and orientations of the mounted optical targets 130 within a map coordinate frame are measured and recorded along with each target code 150 as, for example, a respective LED light pattern for the global localization system to utilize during vehicle operation as described herein. In an embodiment, mapping of the optical targets 130 that are mounted to the ceiling infrastructure may occur through manual mapping utilizing a laser tool such as a laser range finder or laser distance meter or other suitable mapping scanning tools.

Figure 4:
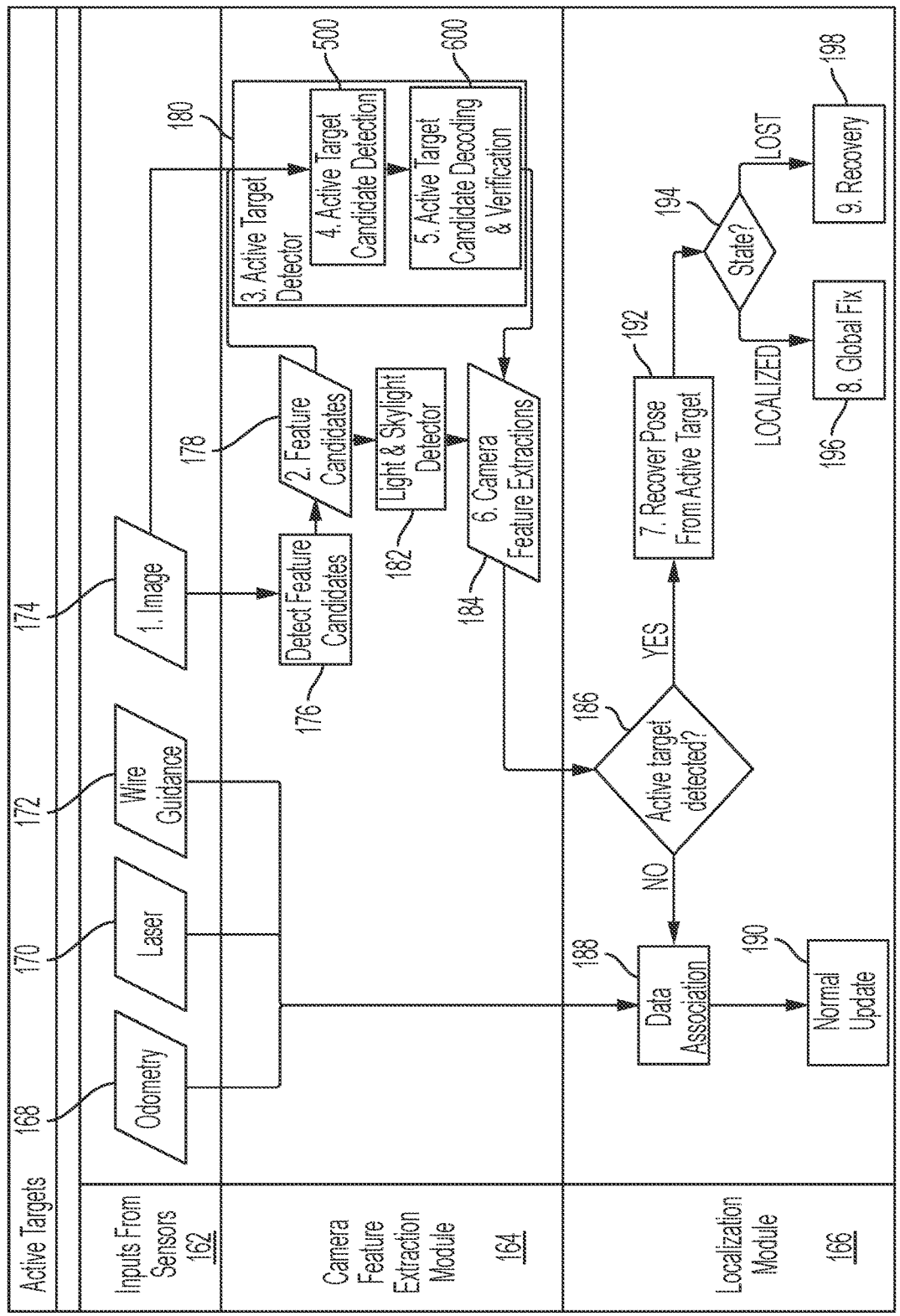
FIG. 4 depicts a flowchart of an exemplary method for camera feature extraction and application and validation of a global localization method within a localization process according to one or more embodiments shown and described herein.

FIG. 4 illustrates a process flowchart of an embodiment of active target usage in the GTLM along with a localization system 160. As an example, and not by way of limitation, in the localization system 160 of FIG. 4, vehicle sensors are configured to receive and process input data in block 162 with respect to odometry as input sensor 168, laser detection of surrounding objects as sensor input 170, and wire guidance to assist with navigation as sensor input 172. The sensor inputs of block 162 are associated as data that is utilized by a localization module 166 to provide a localization for the vehicle as a normal seed update.

In step 1 of FIG. 4, a vehicle sensor is further configured to receive and process image data of overhead features as image input 174 as described herein. For example, an overhead image is captured from a camera disposed on a vehicle. Overhead feature candidates are detected, such as described in U.S. Pat. No. 9,349,181 issued on May 24, 2016, entitled LOST VEHICLE RECOVERY UTILIZING ASSOCIATED FEATURE PAIRS, and U.S. Pat. No. 9,984,467, entitled VEHICLE POSITIONING OR NAVIGATION UTILIZING ASSOCIATED FEATURE PAIRS, issued on May 29, 2018, incorporated by reference above. In step 2, for example, the feature candidates of input 178 are detections in block 176 from the overhead image that the camera feature extraction module 164 has identified as potential features of interest, such as ceiling lights, skylights, and LEDS of active optical targets 130 as described herein. For example, with respect to light detection, the feature candidates are utilized as an input for light and skylights detection. The extracted features 184 of the detected light and/or skylights through block 182 may then be utilized with the associated data for localization to determine vehicle location in the warehouse.

With respect to the GTLM of FIG. 4, the vehicle sensor that receives and processes image data of overhead features specifically may receive and process image data associated with one or more active optical targets 130, as described in greater detail below with respect to the processes 500, 600 of FIGS. 5-6. In particular, step 3 of FIG. 4 sets forth an active target detector module 180 that applies two respective processes 500, 600 for active optical target 130 detection (step 4) through a detection process 500 and verification (step 5) through a verification process 600 of FIG. 6. The detection process 500 of step 4 is set forth in greater detail as the detection process 500 in FIG. 5. The verification process 600 of step 5 is set forth in greater detail as the verification process 600 in FIG. 6. The processes 500, 600 of the active target detector module 180 may occur within a camera feature extraction module 164 of the localization system 160, which extracts active optical targets 130 from the feature candidates of step 2. In step 4, the detection process 500 filters input feature candidate points to remove those that are unlikely to be from one or more LEDs of active optical targets 130 and identifies the feature candidate points that are candidates to be active optical targets 130 or parts of one or more active optical targets 130. In step 5, the verification process 600 applies a method to validate each candidate found in step 4 and to find an associated displayed code, such as a respective LED light pattern.

After step 6 resulting in extracted features 184, if no active optical targets 130 have been found in an active target determination block 186, other localization system processes may continue in which camera features in addition to sensor data, such as input odometry, laser, and wire guidance data, are fused through data association in data association block 188 to estimate a location of the vehicle in an update block 190. However, if after step 6 one or more active optical targets 130 are found in the active target determination block 186, the one or more active optical targets 130 are combined with other ceiling light features detected by the camera feature extraction module and sent to a localization module 166 of the localization system 160. In an embodiment, once an active target 130 is identified and matched with the respective target location coordinates in a map of the warehouse, additional camera feature extraction may be performed on other overhead features as described herein, such as on lights and/or skylights. Once an active target 130 is detected after step 6, a pose of the vehicle is determined and recovered in step 7 in a pose recovery block 192 based on the active target 130. If the active target 130 has been extracted, the pose of the vehicle may be estimated from the extracted active target 130 alone by projecting from a two-dimensional image frame over the overhead image into a three-dimensional global coordinate frame and basing the estimation on mapped target location and geometric parameters of the camera. For example, the location of the plurality of optical targets 130 are mapped and stored in a warehouse map prior to use of the GTLM and localization systems described herein.

A state of localized (to proceed to step 8) or lost (to proceed to step 9) is determined in a state block 194. In step 8, for a localized state, the pose that is calculated from the extracted active optical target 130 may be used to reseed a vehicle localization based on the extracted active optical target 130 to ensure accurate localization in a reseed pose block 196. Such an instance may occur when the localization system 160 is in a localized state but there is a disagreement between a current estimated pose and a pose recovered from the extracted active optical target 130. The recovered pose may then be used to reset the current estimated pose to the recovered pose to reseed the vehicle localization by setting a new vehicle pose. In a recovery pose block of step 9, the pose that is calculated from the extracted active optical target 130 may be used to reseed a current estimate pose to the recovered pose when the localization system 160 is in a lost state.

For example, while a localization system is used to provide localization for an industrial vehicle in an indoor warehouse environment, situations exist in which the localization system may become lost (step 9) or otherwise unable to reliably operate. Example scenarios include where an industrial vehicle may travel outdoors where extractable camera features from overhead ceiling features such as ceiling lights may be unavailable, or where sections of the warehouse environment in which the industrial vehicle may travel have an insufficient density of extractable features to maintain accurate localization. If a state of the localization system is lost such that the vehicle is lost, the recovered pose may be utilized as the new seed or start location for vehicle localization and navigation. After a vehicle leaves a mapped area or loses track of mapped features, for example, the vehicle may be considered to be not localized. In such an instance, the active target 130 may be utilized to facilitate re-localization of the vehicle upon successful detection to recover the vehicle location. GTLM may be utilized in addition to or as an alternative of localization systems. For example, GTLM may be used to maximize availability of accurate localization provided by the localization system, for example, by providing a reliable means to reseed the localization system to known vehicle locations.

If the state of the localization is localized such that a vehicle location is known (step 8), however, the vehicle location may be verified and/or made more accurate based on the recovered pose in a global fix mode. For a vehicle that is localized but with low accuracy, for example, use of the active target 130 permits an increase in localization accuracy of a vehicle upon successful detection of the active target 130. The active target 130 is able to be utilized to verify the predicted vehicle location and to fix the vehicle localization to a high degree of certainty. Such a global fix mode may support a localization system in a variety of manners. As a non-limiting example, active optical targets 130 may be installed in ceiling infrastructure locations where density of other overhead features is insufficient for high accuracy localization with the localization system. Additionally or alternatively, active targets 130 may be installed in locations where availability of a location fix is greatly desirable. Increased uptime in the length of time a vehicle may be localized through the localization system through use of such active targets 130 enhances value of the vehicle localization in the uptime and in improving accuracy of the localization.

Figure 5:
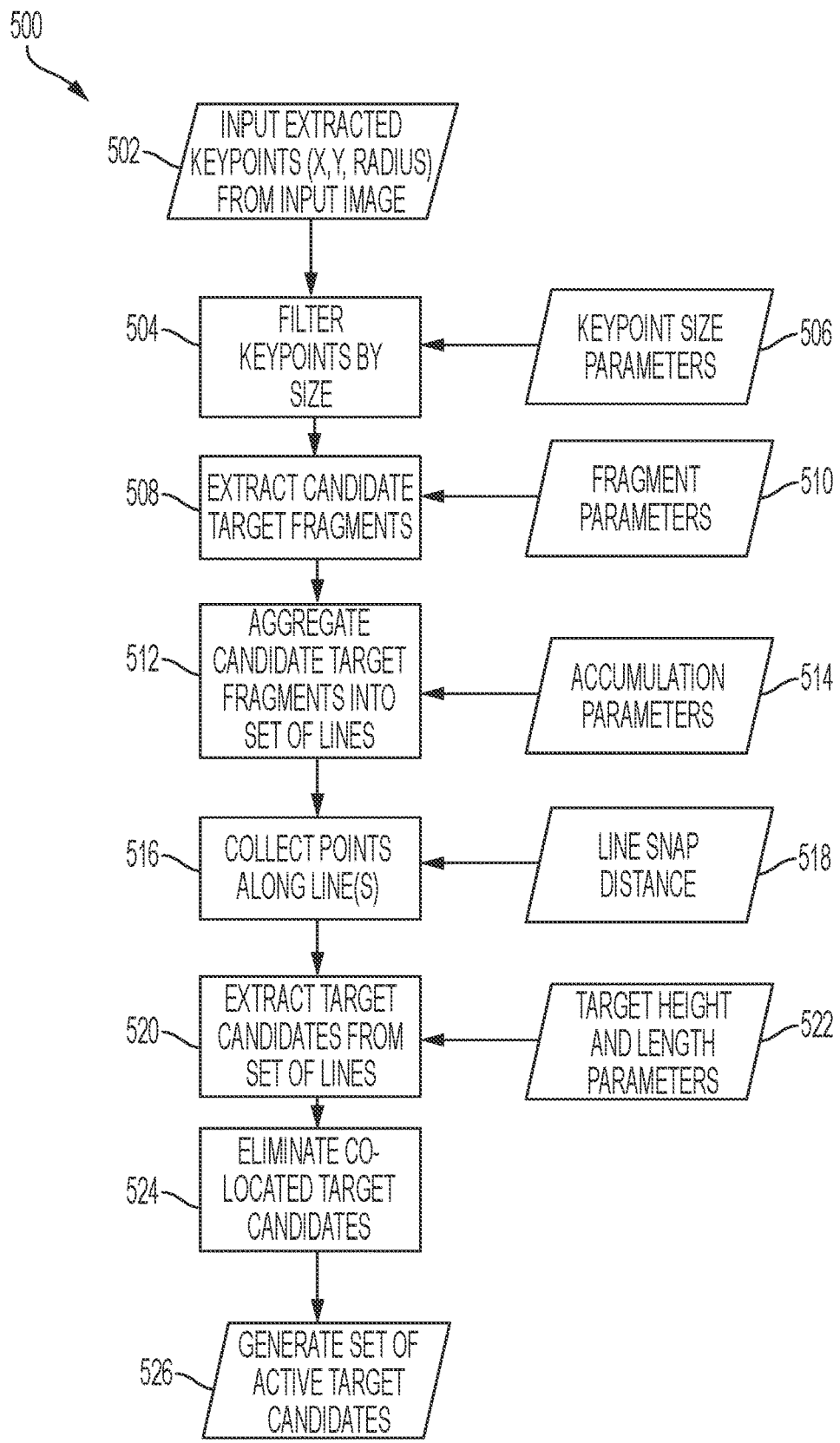
FIG. 5 depicts a flowchart overview of an exemplary method for a global localization method according to one or more embodiments shown and described herein.
Figure 6:
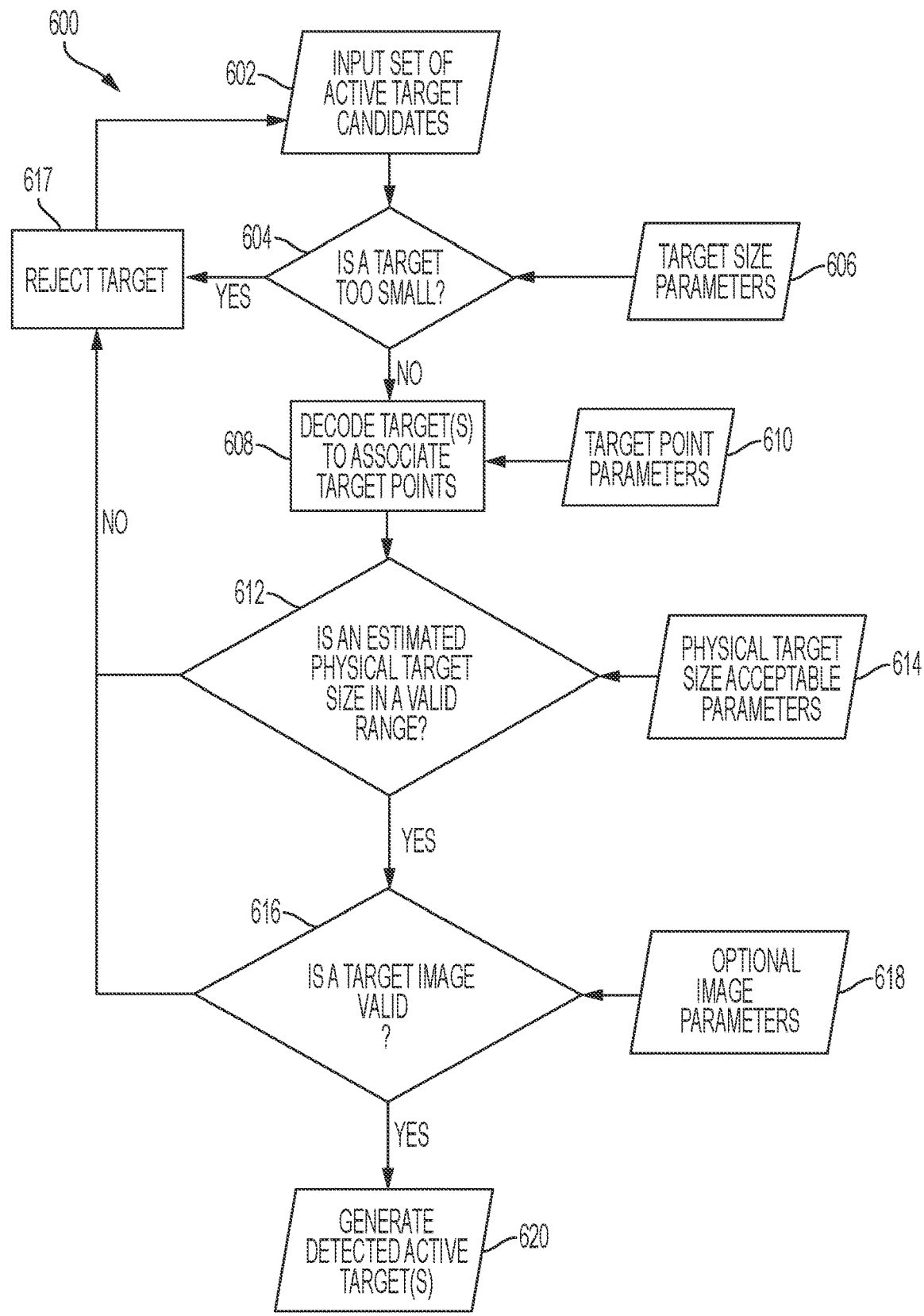
FIG. 6 depicts a flowchart overview of another exemplary method for a global localization method according to one or more embodiments shown and described herein.

The processes of the active target detector module are set forth in greater detail in the respective processes 500, 600 of FIGS. 5-6. An image of an active optical target 130 may be projected with a lens onto an imaging sensor and digitized as a two-dimensional image signal to create the overhead image. In step 1 associated with a block 502 of FIG. 5 of the detection process 500, locations of LEDs of one or more imaged active optical targets 130 are extracted in two-dimensional image space as "keypoint" features respectively associated with the LEDs and including x and y and radius dimensions alongside other overhead features, such as ceiling lights and skylights. These other overhead features, along with the two-dimensional image signal are processed by the active target detector module through the detection process 500 of step 4 and the verification process 600 of step 5 of FIG. 4.

FIG. 5 sets forth the detection process 500 of step 4 of FIG. 4 in greater detail as an active target candidate detection process. In step 2 associated with a block 502 of the detection process 500 of FIG. 5, the detection process filters all keypoint features that are too large to be an LED of an active optical target 130 from the overhead image. Constraints of a block 506 input into the detection process in step 2 of the block 504 may include a maximum keypoint feature size coefficient and a keypoint feature size fall off to indicate acceptable keypoint feature size ranges.

In step 3 associated with a block 508, the detection process 500 searches in the set of remaining keypoint features for arrangements of imaged LEDs that may be an active optical target 130 or part of an active optical target 130. The searched information includes a set of active target fragments representative of a set of coordinates of imaged LEDs that represent a collinear pattern. The active target fragments are collected and stored in a data structure, such as in a memory module. Constraints of a block 510 input into the detection process 500 in step 3 associated with the block 508 may include a maximum target aspect ratio, a maximum side length, and a maximum area of a bounding box tightly fitted to the detected features associated to an active optical target 130.

In step 4 associated with a block 512 of the detection process 500, the set of active target fragments is aggregated and combined into a set of lines containing potential active optical targets 130. Such an aggregation reduced an amount of data to be processed, increasing efficiency and processing speed of the active target detector module. In embodiments, such a set of lines are not line segments, i.e., there is no start or end point but rather are infinitely long and described only by their angle to the horizontal coordinate axis and distance to the origin of the coordinate system describing UV space. After performance of the aggregation of step 4 of the block 512, all target candidates may be collinear to one of such lines. Multiple target candidates may be on the same line, either because there is more than one target on a computed line, or there are other target candidates on the computed line, which in subsequent processing steps turn out to be false detections. These target candidates may be overlapping within a computed line, such as where one true active optical target 130 is on a line, and another one detected active target is false, consisting of two keypoint features from the true active optical target 130 and one or more noisy extractions. As the localization systems described herein are not limited to detecting only one active target per image frame, there may be more than one such line containing active target candidates. For instance, there may be two parallel targets installed closeby at, for example, a 40 cm distance, resulting in at least two lines containing active target candidates. The aggregation of step 4 of the block 512 provides for a removal of duplicates of such lines, and the aggregation parameters as the accumulation parameters of a block 514 define when two slightly different lines may be considered equivalent. Such a slight difference between lines may appear due to digitization effects such as pixel binning and the like. The aggregation allows for removal of duplicate lines for processing, for example, which increases performance efficiency and speed of subsequent steps as fewer such lines have to be processed.

An input into the detection process 500 in step 5 associated with a block 516 may be a line snap distance of a block 518. As a non-limiting example, a set of keypoint features and a set of lines as described above may exist in UV space. The line snap distance parameter assists with a determination of which keypoint feature belongs to which line. For example, the line snap distance parameter may specify that a keypoint feature x belongs to a line y if the distance (i.e., length of the line segment of the orthogonal projection of x onto y) of x to y is less than the line snap distance. Other associations between keypoint features and lines using a suitable data structure are contemplated with the scope of this disclosure.

Potential candidate active optical targets 130 are extracted from each line of the set of lines in steps 6 and 7 respectively associated with blocks 520, 524. In step 6 associated with a block 520, inputs as target height and length parameters from a block 522 may include a target height range, a minimum acceptable target length, a maximum acceptable target length, and candidate height slack. By way of example and not by limitation, step 6 is directed toward early filtering of active target candidates to reduce computational costs by reducing the number of candidates. An active target candidate is checked for a size and position in UV space to determine that it might be an active optical target 130. For instance, a row of detected ceiling lights would be filtered out at this step. For each target candidate, the system in an embodiment back-projects from UV space to 3D space to estimate the physical size of the target candidate. This size estimate should be between input parameters of minimum acceptable target length and maximum acceptable target length. However, at this stage the code 150 for the active optical target 130 may be unknown such that there is not a single height that could be used. Hence, the target candidates are compared to the range of all heights of active targets in the warehouse map. The parameter candidate height slack may specify an additional global uncertainty on the target height estimates to make the system tolerant to estimation errors introduced by factors such as, but not limited to, slightly inaccurate camera parameters, a truck that is not exactly level, a mapped (measured) active target height that is not exact, and the like. In embodiments, the processes described herein filters the most candidates that otherwise would be rejected at a later, computationally more costly stage in more efficient manner if the active target heights are homogeneous across all possible target codes, or if there is a small amount of subset with homogeneous heights (e.g., targets installed only at 8 meters and 12 meters height).

In an embodiment, multiple candidate active optical targets 130 may be extracted from each line to facilitate extraction of active optical targets 130 in the presence of noise associated with noisy detections. In step 7 associated with the block 524, conflicting candidate active optical targets that may be the result of insufficient data aggregation are eliminated. In step 8 associated with a block 526, a set of candidate active optical targets 130 are output from the detection process 500 of FIG. 5.

FIG. 6 sets forth the verification process 600 of step 5 of FIG. 4 in greater detail, depicting steps of a decoding and verification process applied to the set of candidate active optical targets 130 output from the detection process 500 of FIG. 5. The verification process 600 follows the detection process 500 of FIG. 5 such that the set of candidate active optical targets 130 output in step 8 and the block 526 of FIG. 5 are input in a block 602 into the verification process 600 in step 9 associated with the block 602 of FIG. 6. The verification process 600 is applied to all of the set of candidate active optical targets 130. Decoding and verification of the candidate active optical targets 130 takes into account an optical modulation transfer function is not perfect such that a resolution of the optical system is limited and such that the resolution may deteriorate towards image corners.

In areas of low contrast, there may be a reduced reliability of feature extractions due to an imperfect modulation transfer. In such situations, the verification process for active target candidate verification may start with filtering target candidates that are too small for reliable decoding in step 10 associated with a block 604 of FIG. 6. Inputs as target size parameter in a block 606 may include a maximum image space extent and radial symmetric decay. In embodiments, the maximum image space extent parameter relates to the size a target candidate must have in UV space for not being rejected due to unreliable decoding, such as in an example in which some LEDs were not detected when observing the active target at a larger distance. The radial symmetric decay parameter may take into account a situation in which the image quality is best at the center of the image and decreases towards its corners due to imperfect lenses and vignetting. The system may implement a radial-symmetric (exponential) model where the radial symmetric decay parameter specifies a magnitude of the falloff in image quality towards the image corners. In effect, if a target candidate is detected in the image corner, the detected corner target candidate may be processed further only if the detected corner target candidate is at least bigger or longer in UV space than the maximum image space extent parameter. An acceptable minimum target candidate size in two-dimensional image UV space may be smaller in a center of the overhead image and increasing toward image corners. A distance in image UV space between two detected LEDs may be at least 2 pixels, though other larger or smaller distances are contemplated within the scope of this disclosure.

In step 11 associated with a block 608, information stored in a pattern of active target LEDs may be decoded for target candidates that are not too small for reliable decoding. Inputs as target point parameters from a block 610 may include tolerances for inner target point locations. An inner points location tolerance parameter may be used in the active target candidate decoding subroutine. As a non-limiting example, where the LEDs on the physical active target are equidistantly spaced, before decoding the observed target candidate undergoes projection to the ceiling plane for projective undistortion. This projection may not be perfect due to imperfect camera calibration or truck not being level or installed active targets not being level, for example. Therefore, projected LEDs may not appear perfectly equidistantly spaced in UV space. Pixel locking effects introduced by the camera sensor may contribute further to non-equidistantly spaced keypoint detections. To allow the system to work with such imperfections in decoding the active target candidate, the system may allow the extracted features to shift a certain percentage of the active target length in UV space. For example, if a target is 100 pixel long in UV space, and an inner target points location tolerance parameter is set to a value of 0.02, then detected keypoints of an active target will be interpreted as a LED in 'switched ON' configuration if located within 2 pixels of its ideal location in UV space. In embodiments, decoding may be preceded by a perspective projection of these LED point patterns onto a three-dimensional plane parallel to a floor to eliminate perspective distortion. Such a projection may utilize calibrated camera parameters including camera pose with respect to the vehicle as an input. Any candidate active optical targets 130 for which no valid code is detected are rejected.

In step 12 associated with a block 612, for any successfully decoded candidate active optical target 130, a three-dimensional representation of detected LEDs of the active optical target 130 is used to estimate a physical size of the active optical target 130 based on a mapped height of the candidate targets having the code. A candidate target not within a valid size range is rejected. Inputs to determine whether a candidate target is within a valid size range may include a minimum and maximum acceptable physical target size as physical target size acceptable parameters of a block 614.

In step 13 associated with a block 616, the verification process 600 proceeds to determine whether a target image is valid. In an embodiment, such a determination is based on an image signal validation utilizing computing normalized cross correlation between pairwise image patches around detected LEDs. A system check may analyze an image signal associated with the candidate active optical target 130 to reject false positive detections, for instance in high contrast image regions, such as those regions associated with skylights. As a non-limiting example, for a detected active target candidate, all associated locations in UV space may be computed with respect to a potential position of one or more active target LEDs independent of whether the active target LEDs have an on or off status. Such locations may be computed through interpolation in 3D space followed by a back-projection to UV space. Image patches centered at the detected or interpolated LED locations may be selected, and dimensions of these image patches may scale with a distance between the locations and be set such that pairwise overlap of image patches in UV space is minimized. Suitable image similarity metrics may be computed between pairwise image patches. By way of example, and not as a limitation, if the maximum of pairwise similarities of image patches corresponding to the one or more detected LEDs is lower than a minimum threshold of pairwise similarities of patches with respect to patches corresponding to the detected and/or interpolated LED locations, the active target detection may be rejected to eliminate false positive rejections in block 617. The rejection in block 617 may not be based on one or more parameters, which may be optional. For example, alternatively, the rejection in block 617 may be parameterized with the optional image parameters of block 618, such as to provide flexibility in defining rejection criteria, as required based on a specific image validity check scheme.

In another embodiment, the determination is based on whether the background is valid, and a final system check may analyze an image signal associated with the candidate active optical target 130 to reject false positive detections in high contrast image regions, such as those regions associated with skylights. Inputs as image background parameters of a block 618 of optional image parameters may include a dark level low threshold value, a dark level high threshold value, and a target brightness threshold absolute value. As a non-limiting example, histograms of grey values are built from a dilated bounding box of the candidate active optical target 130 to reject false positive detections based on a histogram distribution of the grey values of the pixels within the aforementioned bounding box. For a determination that the target image of a candidate target is not valid in the block 616, the candidate target is rejected in a block 617 and one or more other candidate targets from the process 700 are analyzed. For a determination that the target image of a candidate target is valid in the block 616, the candidate target is accepted as a detected active target. In a step 14 associated with a block 620, one or more detected active targets are generated.

Active optical targets 130 that are detected that have a code that is not unique across a site may be analyzed as well. For such targets, a localization system may use surrounding features to resolve an ambiguity associated with potential locations corresponding to such active optical targets 130 having a similar or equivalent code or pattern.

In embodiments, the localization system may identify specific targets having an equivalent code by examining respective surrounding overhead features such as lights and skylights to differentiate between the targets. In such processes, an active optical target 130 may be extracted from an overhead image as described above and have a respective code identified. Centroids from any overhead features such as ceiling lights in the same overhead image frame are extracted, and all locations in a stored map having the extracted code of the extracted active optical target 130 are determined. For each identified target location with an identified extracted code, an associated pose of the vehicle is calculated. The localization system feature map is filtered and used to identify surrounding local overhead features around the optical target 130 using the pose and to project these features to a two-dimensional image space to be used as predictions of an active optical target 130. A nearest-neighbor data associated may be performed to match the predictions and overhead feature extractions from the image frame in two-dimensional image space. Other suitable data association methods are contemplated within the scope of this disclosure.

Further, a pose fitness may be calculated. As an example and not a limitation, the pose fitness may be a mean match error between the predictions and extractions, and a number of matches found may be retained. A candidate target with a best pose fitness, such as in one example having the smallest associated error, may be selected and passed on as the active optical target 130 to the localization system as described above to determine vehicle pose. In situations where multiple targets return low and similar pose fitnesses, a number of matches from the data associated may be used to determine a selected active optical target 130 from the options as the one with the most matches. If the number of matches is the same between targets, the system may reject the target from the overhead image or perform a plurality of additional tests to disambiguate within the set of target candidates.

In embodiments, parameters that may affect the detection process described above with respect to FIG. 5, for example, may be detection range and detection reliability. A spatial range of possible detections of a plurality of optical targets 130 may be based on a height difference between an installed active optical target 130 and a center of the camera on the vehicle, the camera orientation, an active optical target 130 orientation within the warehouse environment, and a brightness and spacing of LEDs on the active optical target 130. For example, active optical targets 130 disposed at a higher level compared to others in a warehouse environment may permit a larger detection range due to a larger cone of visibility from the camera. Such higher targets may require brighter, further spaced LEDs to provide an image contrast sufficient for initial keypoint feature detection as described herein. For optical target 130 at a lower height range having a high LED brightness, a detection range may be based on a viewing direction. As a non-limiting example, viewing such a lower optical target 130 in a direction perpendicular to a direction of the target may cause less foreshortening than viewing the lower optical target 130 in line and parallel with the direction of the target to permit larger detection ranges.

Detection reliability may be based on an amount of surrounding visual clutter that may restrict LED visibility for the LEDs on an optical target 130. Racking or pipes, for example, may occlude camera view of such LEDs or entire optical targets 130 to prevent detection. In embodiments, successive subsequent frames may be analyzed to mitigate a chance of incorrect detection.

In embodiments, other variant processes exist to extract active target candidates. A viability of these variants may depend on computational power available and the amount of visual clutter present in the image. Images with minimal visual clutter may permit extraction of active targets directly from a suitable space partitioning of the extracted feature points, which can be obtained, for instance, with a recursive 2-cluster KMEANS scheme. In such a scheme, the recursive descent terminates if the expected number of LEDs has been reached or the feature points satisfy a specific collinearity criterion in image space. Such an action induces a partition on the set of keypoint features and may be in alternative or in addition to the aggregation step described herein.

In embodiments, an active target may be missed in the partition detection scheme such that an active target candidate is not generated if the partition separates the individual LED detections in the target. Thus, such a partition scheme may be suited to active targets well separated spatially from other features in UV space.

Images with higher levels of visual clutter, such as those including extracted feature points that are not related to projections of active target LEDs, may undergo a more exhaustive search. As a non-limiting example, a technique to constrain the search space in order to limit computational costs that may be used involves computing a Delaunay triangulation of the extracted feature points and aggregate the edges of the resulting Delaunay graph as described in this disclosure. In embodiments in which a moderate visual clutter is present in the vicinage of true active target candidates, an aggregation may be efficiently implemented by direct traversal of the Delaunay graph starting from selected unvisited vertices in a depth-first fashion and terminate based on aforementioned collinearity criteria of currently visited vertices. Due to computational costs, a fully exhaustive search may be permitted only for extremely cluttered scenes. In such extremely cluttered scenes, for example, there may be a high likelihood of more than one false positive feature extraction appearing within the perimeter of a circle. The circle may include center point located at the bisection of the two most distant adjacent true positive active target feature extractions and a diameter equivalent to the distance of these two true positive active target feature extractions.

Figure 7:
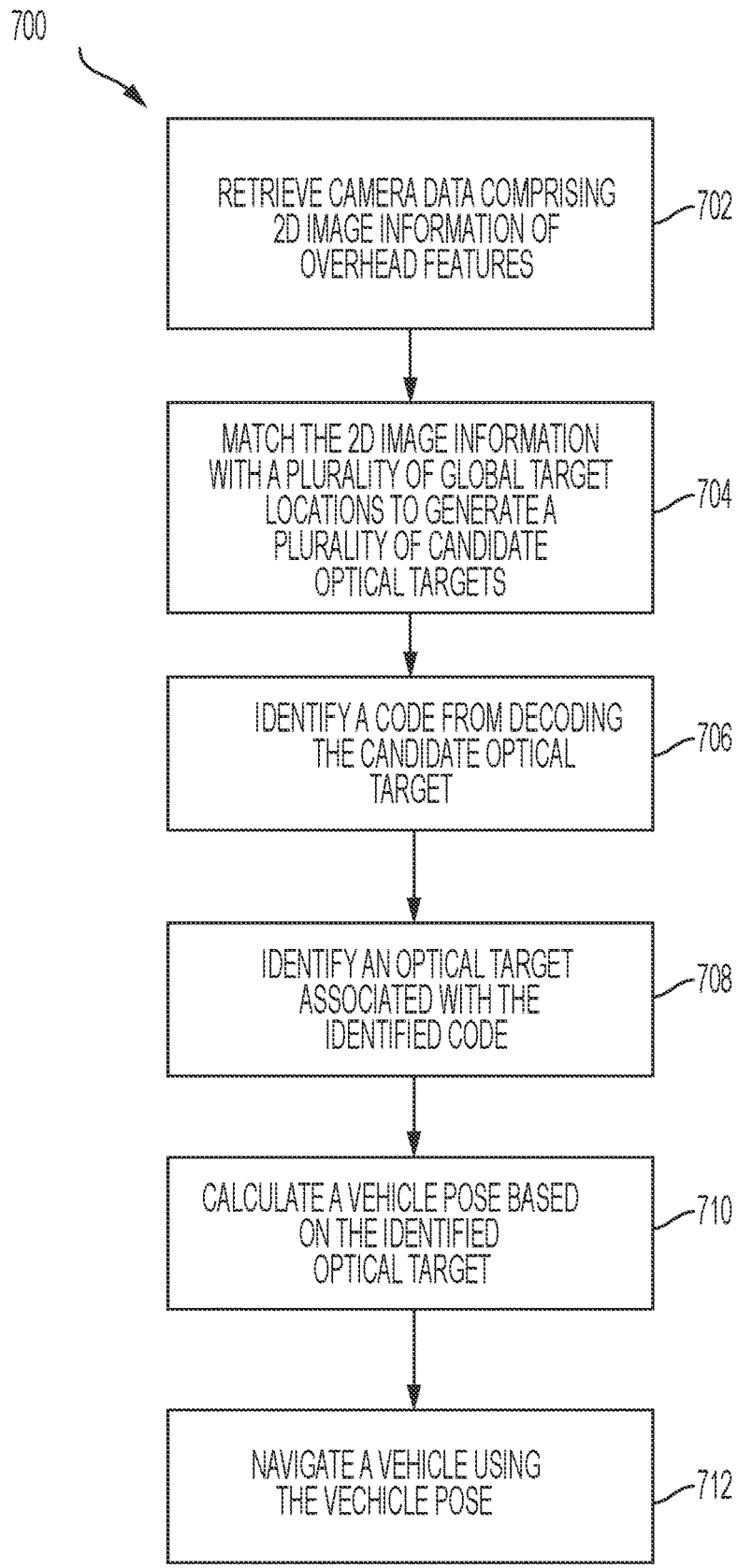
FIG. 7 depicts a flowchart overview of another yet exemplary method for a global localization method according to one or more embodiments shown and described herein.

FIG. 7 illustrates a process 700 associated with navigating and/or tracking a materials handling vehicle 100 along an inventory transit surface 122 based on identifying an optical target from an input image of overhead features as described herein. In an embodiment, and as described herein, the materials handling vehicle 100 includes a camera 102, a vehicular processor 104, a drive mechanism configured to move the materials handling vehicle 100 along the inventory transit surface 122 through, for example, the wheels 124, a materials handling mechanism configured to store and retrieve goods in a storage bay of the warehouse 110, and vehicle control architecture in communication with the drive and materials handling mechanisms. The camera 102 is communicatively coupled to the vehicular processor 104 and captures an input image of overhead features of the warehouse 110.

The vehicular processor of the materials handling vehicle executes vehicle functions, such as those set forth in the process 700. The vehicle functions may be to retrieve camera data comprising two-dimensional image information of overhead features in block 702. For example, a function may be to retrieve an initial set of camera data from the camera 102. The initial set of camera data may include two-dimensional image information associated with the input image of overhead features.

The two-dimensional image information may be matched with a plurality of global target locations to generate a plurality of candidate optical targets 130 in block 704. For example, the two-dimensional image information from the initial set of camera data may be matched with a plurality of global target locations of a warehouse map to generate the plurality of candidate optical targets 130. The global target locations of the warehouse map may be associated with a mapping of the overhead features. The warehouse map may be configured to store a position and orientation of an optical target 130 associated with each global target location, and each optical target 130 may be associated with a code 150. In embodiments, each optical target 130 may include a plurality of point light sources, such as the LEDs 134 as described herein. The plurality of light sources may be mounted on the bar 132 that is configured for attachment to a ceiling of the warehouse 110 as an overhead feature. The plurality of light sources may be arranged in a pattern defining the code 150 for each respective optical target 130. Thus, the plurality of point light sources may include a light pattern as the code 150 for each respective optical target 130. As described herein, the plurality of point light sources may be mounted on the central strip portion 136 in an equidistant and linear manner. Further as described above, the plurality of point light sources may be configured to emit a white light, monochromatic light, light with a narrow spectral bandwidth, or combinations thereof.

For example, each optical target 130 may include the plurality of LEDs 134. As described above, the plurality of LEDs 134 may be covered by respective angular diffusion lenses configured to attenuate a forward brightness and increase an associated angular sideways brightness such that each LED 134 has an angular emission characteristic comprising a higher energy emission toward angular side directions compared to a forward facing direction of each LED 134.

In embodiments, each optical target 130 may include a series of magnetic mounts disposed on a back surface opposite a front surface on which the plurality of point light sources (such as the LEDs 134) are mounted, the series of magnetic mounts configured to mount each optical target 130 against a ceiling to comprise an overhead feature of the warehouse 110. As described herein, each optical target 130 may include the center-fiducial marker 140 configured to aid with storing of the position of each optical target 130 in the warehouse map. The center-fiducial marker 140 may be configured to be detected by a laser distance meter disposed on and from the inventory transit surface 122 to generate the position of each optical target 130. Further, each optical target 130 may include the end marker 142 configured to aid with storing of the orientation of each optical target 130 in the warehouse map.

In block 706, the plurality of candidate optical targets 130 may be filtered to determine a candidate optical target 130, and the candidate optical target 130 may be decoded to identify the code 150 associated with the candidate optical target 130. In block 708, an optical target 130 associated with the identified code 150 may be identified. Further, a camera metric may be determined, the camera metric including representations of a distance and an angle of the camera 102 relative to the identified optical target 130 and the position and orientation of the identified optical target 130 in the warehouse map.

In block 710, a vehicle pose may be calculated based on the identified optical target 130. For example, the vehicle pose may be calculated based on the camera metric. In block 712, the materials handling vehicle 100 may be navigated using the vehicle pose of block 710. The vehicle processor 104 of the materials handling vehicle 100 may further be configured to repeat the steps of the process 700 with a subsequent set of camera data from the camera 102 when the materials handling vehicle 100 is lost. The vehicular processor 104 may execute vehicle functions to determine if the materials handling vehicle 100 is lost, including at least one of determining whether a seed position includes incorrect data, and determining whether the camera data is insufficient to correct for an error associated with an accumulated odometry associated with the materials handling vehicle 100.

In embodiments, the vehicle processor 104 of the materials handling vehicle 100 may further execute functions to use an accumulated odometry associated with the materials handling vehicle 100 to update the vehicle pose to a current localized position, update a seed position as the current localized position, and track the navigation of the materials handling vehicle 100 along the inventory transit surface 122, navigate the materials handling vehicle 100 along the inventory transit surface 122 in at least a partially automated manner, or both, utilizing the current localized position. The seed position may be published as the current localized position on a display after updating the seed position as the current localized position.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

For the purposes of describing and defining the present disclosure it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A materials handling vehicle comprising a camera, a vehicular processor, a drive mechanism configured to move the materials handling vehicle along an inventory transit surface, a materials handling mechanism configured to store and retrieve goods in a storage bay of a warehouse, and vehicle control architecture in communication with the drive mechanism and the materials handling mechanism, wherein:
  the camera is communicatively coupled to the vehicular processor and captures an input image of overhead features; and
  the vehicular processor of the materials handling vehicle executes vehicle functions to
    (i) generate a plurality of candidate optical targets for an overhead feature of the overhead features in the input image to identify the overhead feature in the input image as a captured optical target in the input image, wherein each optical target is associated with a code,
    (ii) filter the plurality of candidate optical targets for the overhead feature to generate a ranking for each filtered plurality of candidate optical targets;
    (iii) determine a candidate optical target for the captured optical target in the input image based on a highest ranking of the ranking for each filtered plurality of candidate optical targets;
    (iv) identify the code of the candidate optical target associated with the highest ranking of the filtered plurality of candidate optical targets to determine an identified code, (v) in response to the determination of the identified code, identify an optical target associated with the identified code to determine an identified optical target representative of the captured optical target in the input image at the global target location, (vi) in response to the determination of the identified optical target, determine a camera metric comprising representations of a distance and an angle of the camera relative to the identified optical target and the position and orientation of the identified optical target in the warehouse map, (vii) calculate a vehicle pose based on the camera metric, and (viii) navigate the materials handling vehicle utilising the vehicle pose.

2. The materials handling vehicle of claim 1, wherein each optical target comprises a plurality of light emitting diodes (LEDs).

3. The materials handling vehicle of claim 1, wherein each optical target comprises a plurality of light emitting diodes (LEDs) covered by respective angular diffusion lenses configured to attenuate a forward brightness and increase an associated angular sideways brightness such that each LED has an angular emission characteristic comprising a higher energy emission toward angular side directions compared to a forward facing direction of each LED.

4. The materials handling vehicle of claim 1, wherein each optical target is a unique optical target and comprises a plurality of point light sources arranged in a pattern defining the code for each respective unique optical target as a respective unique code.

5. The materials handling vehicle of claim 1, wherein:
each optical target comprises a plurality of point light sources mounted on a bar that is configured for attachment to a ceiling as an overhead feature of the overhead features;
the plurality of point light sources comprise a light pattern as the code for each respective optical target.

6. The materials handling vehicle of claim 5, wherein the plurality of point light sources are mounted on a central strip portion in an equidistant and linear manner.

7. The materials handling vehicle of claim 5, wherein the plurality of point light sources are configured to emit a white light, monochromatic light, light with a narrow spectral bandwidth, or combinations thereof.

8. The materials handling vehicle of claim 1, wherein each optical target comprises a series of magnetic mounts disposed on a back surface opposite a front surface on which a plurality of point light sources are mounted, the series of magnetic mounts configured to mount each optical target against a ceiling to comprise an overhead feature of the overhead features of the warehouse.

9. The materials handling vehicle of claim 1, wherein each optical target comprises a center marker configured to be detected by a laser distance meter from the inventory transit surface to generate a position of each optical target to be stored in a warehouse map.

10. The materials handling vehicle of claim 9, wherein the center marker is configured to be detected by the laser distance meter disposed on the inventory transit surface to generate the position of each optical target.

11. The materials handling vehicle of claim 1, wherein each optical target comprises an end marker configured to be detected by a laser distance meter from the inventory transit surface to generate an orientation of each optical target to be stored in a warehouse map.

12. The materials handling vehicle of claim 1, wherein the vehicular processor further executes vehicle functions to:
(i) update the vehicle pose to a current localized position;
(ii) update a seed position as the current localized position; and
(iii) track the navigation of the materials handling vehicle along the inventory transit surface, navigate the materials handling vehicle along the inventory transit surface in at least a partially automated manner, or both, utilising the current localized position.

13. The materials handling vehicle of claim 12, wherein the vehicular processor further executes vehicle functions to publish the seed position as the current localized position on a display after updating the seed position as the current localized position.

14. The materials handling vehicle of claim 1, wherein the vehicular processor is configured to repeat steps (i)-(viii) with a subsequent set of camera data and input image when the materials handling vehicle is lost.

15. A materials handling vehicle comprising a camera, a vehicular processor, a drive mechanism configured to move the materials handling vehicle along an inventory transit surface, a materials handling mechanism configured to store and retrieve goods in a storage bay of a warehouse, and vehicle control architecture in communication with the drive mechanism and the materials handling mechanism, wherein:
the camera is communicatively coupled to the vehicular processor and captures an input image of overhead features; and
the vehicular processor of the materials handling vehicle executes vehicle functions to
(i) generate a plurality of candidate optical targets for an overhead feature of the overhead features in the input image to identify the overhead feature in the input image as a captured optical target in the input image, wherein each optical target is associated with a code, wherein
each optical target comprises a plurality of point light sources mounted on a bar that is configured for attachment to a ceiling as an overhead feature of the overhead features, and
the plurality of point light sources comprise a light pattern as the code for each respective optical target,
(ii) filter the plurality of candidate optical targets for the overhead feature to generate a ranking for each filtered plurality of candidate optical targets;
(iii) determine a candidate optical target for the captured optical target in the input image based on a highest ranking of the ranking for each filtered plurality of candidate optical targets;
(iv) identify the code of the candidate optical target associated with the highest ranking of the filtered plurality of candidate optical targets to determine an identified code,
(v) in response to the determination of the identified code, identify an optical target associated with the identified code to determine an identified optical target representative of the captured optical target in the input image at the global target location,
(vi) in response to the determination of the identified optical target, determine a camera metric comprising representations of a distance and an angle of the camera relative to the identified optical target and the position and orientation of the identified optical target in the warehouse map, (vii) calculate a vehicle pose based on the camera metric, and (viii) track the navigation of the materials handling vehicle along the inventory transit surface, navigate the materials handling vehicle along the inventory transit surface in at least a partially automated manner, or both, utilising the vehicle pose.

16. The materials handling vehicle of claim 15, wherein the plurality of point light sources are mounted on a central strip portion in an equidistant and linear manner.

17. The materials handling vehicle of claim 15, wherein the plurality of point light sources are configured to emit a white light, monochromatic light, light with a narrow spectral bandwidth, or combinations thereof.

18. A method of navigating or tracking the navigation of a materials handling vehicle along an inventory transit surface, the method comprising:

disposing a materials handling vehicle upon an inventory transit surface of a warehouse, wherein the materials handling vehicle comprises a camera, a vehicular processor, a drive mechanism configured to move the materials handling vehicle along the inventory transit surface, a materials handling mechanism configured to store and retrieve goods in a storage bay of the warehouse, and vehicle control architecture in communication with the drive mechanism and the materials handling mechanism;

utilizing the drive mechanism to move the materials handling vehicle along the inventory transit surface;

capturing an input image of overhead features of the warehouse via the camera as the materials handling vehicle moves along the inventory transit surface;

generating a plurality of candidate optical targets for an overhead feature of the overhead features in the input image to identify the overhead feature in the input image as a captured optical target in the input image, wherein each optical target is associated with a code;

filtering the plurality of candidate optical targets for the overhead feature to generate a ranking for each filtered plurality of candidate optical targets;

determining a candidate optical target for the captured optical target in the input image based on a highest ranking of the ranking for each filtered plurality of candidate optical targets;

identifying the code of the candidate optical target associated with the highest ranking of the filtered plurality of candidate optical targets to determine an identified code;

in response to the determination of the identified code, identifying an optical target associated with the identified code to determine an identified optical target representative of the captured optical target in the input image at the global target location;

in response to the determination of the identified optical target, determining a camera metric comprising representations of a distance and an angle of the camera relative to the identified optical target and the position and orientation of the identified optical target in the warehouse map;

calculating a vehicle pose based on the camera metric; and navigating the materials handling vehicle utilising the vehicle pose.

19. The method of claim 18, wherein:

each optical target comprises a plurality of point light sources mounted on a bar that is configured for attachment to a ceiling as an overhead feature of the overhead features;

the plurality of point light sources comprise a light pattern as the code for each respective optical target.

* * * * *